United States Patent [19]
Bende

[11] 3,936,900
[45] Feb. 10, 1976

[54] SAUSAGE BRUSHING APPARATUS
[76] Inventor: Miklos Bende, 17 Fairview Court, Clarendon Hills, Ill. 60514
[22] Filed: Mar. 12, 1975
[21] Appl. No.: 557,636

[52] U.S. Cl. .................................. 15/3.12; 15/88
[51] Int. Cl.² ............................................ A46B 13/04
[58] Field of Search ................. 15/3.1, 3.12–3.17, 15/21 A, 21 D, 88, 97

[56] References Cited
UNITED STATES PATENTS
| 2,980,935 | 4/1961 | Bogard et al. | 15/21 A X |
| 3,284,828 | 11/1966 | Jennings et al. | 15/21 D |

FOREIGN PATENTS OR APPLICATIONS
1,418,866   10/1965   France .................................. 15/3.12

Primary Examiner—Edward L. Roberts
Attorney, Agent, or Firm—Wolfe, Hubbard, Leydig, Voit & Osann, Ltd.

[57] ABSTRACT
An apparatus for brushing encased sausages to remove encrusted materials therefrom including an enclosed base housing having a closed chamber therein with an elongated opening on the upper surface of the housing leading to the chamber. An upright support disposed above the housing carries a vertically movable transverse member that suspends a plurality of encased sausages above the housing opening. A pair of elongated brushes are disposed within the housing chamber and beneath the opening with the axes of the brushes being generally parallel and skewed with respect to one another and the brushes are counter-rotated at predetermined speeds and directions so that when the encased sausages are moved downward through the housing opening into the area between the brushes, the sausages are brushed longitudinally and are rotated about their own axis during the brushing action. The support structure is counter-balanced so as to fully support the suspended sausages and the base housing includes auxiliary spray means to wash the sausages incident to brushing as well as an auxiliary exhaust system to prevent the brushed off materials from being thrown into the air outside the housing.

9 Claims, 3 Drawing Figures

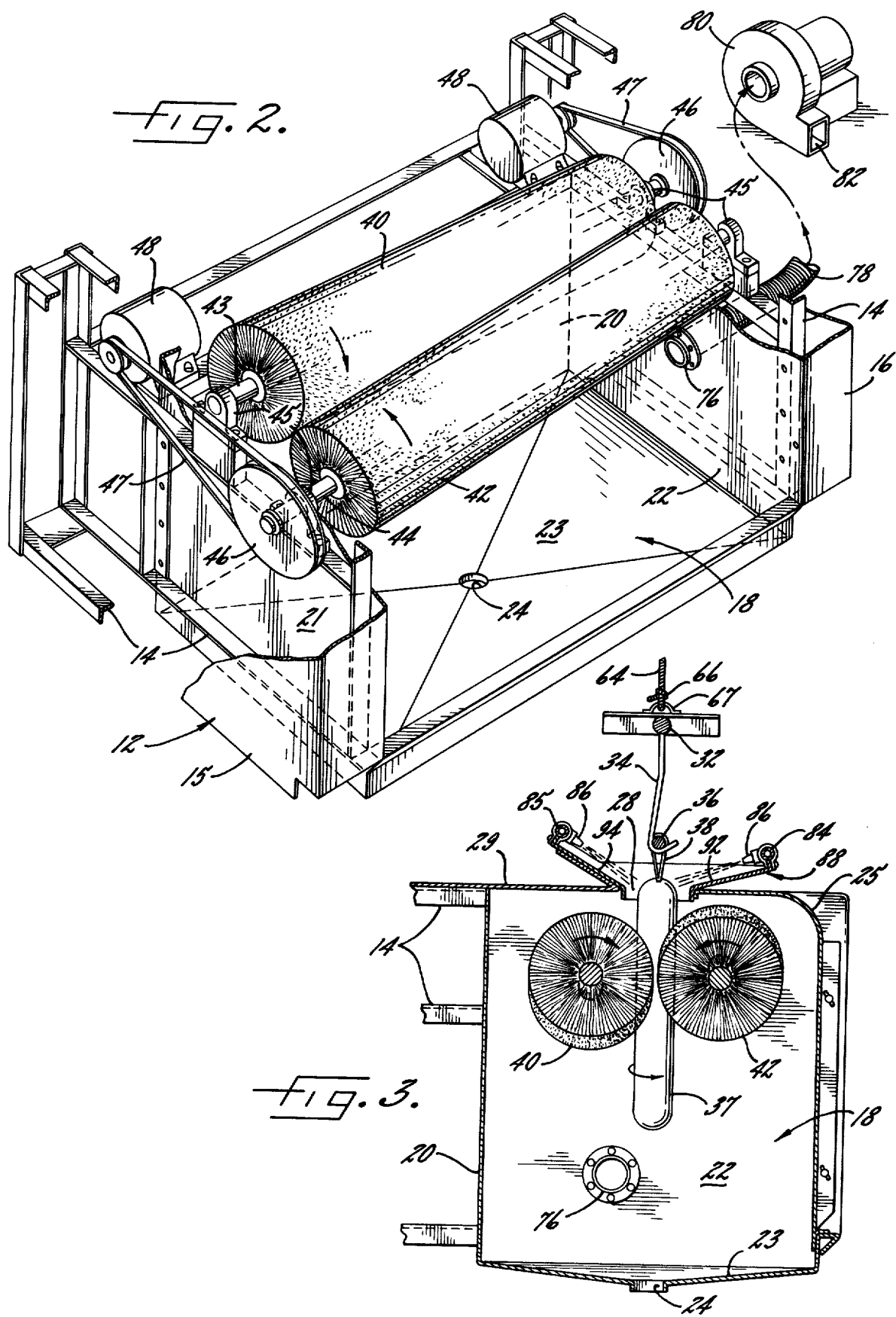

SAUSAGE BRUSHING APPARATUS

DESCRIPTION OF THE INVENTION

This invention relates generally to brushing or cleaning encased sausage products, and more particularly concerns an improved apparatus for brushing or cleaning encased sausage and the like prepared by a drying process on a production basis.

Generally, sausage of various types is among the older forms of processed food. Basically, the different types of sausage consist of comminuted meat, but sausages vary because of the spices and other ingredients added and the varied methods of processing. There are several classifications of sausage including, fresh or uncooked, smoked, and dry. Among these classes alone there may be hundreds of varieties marketed as sausage and ready-to-serve meat products.

A dry sausage such as certain salamis, for example, may be made from fresh, comminuted meat to which curing ingredients and spices have been added, and which may be followed by a period of several days curing. The product may then be encased in a natural or artificial casing followed by processing in a carefully controlled air drying atmosphere for a considerable period of time. During the drying operation, crusts or formations occur on the outside of the casing from the bacterial growth and the residues left from the dried fats and oils that come out of the sausage through the permeable casing.

Conventionally, such sausages leaving the encasing operation wherein the ends are tied off with string or the like, are suspended in a predetermined number depending upon the size on a stick which may be hung on suitable hooks or supports in a air drying room. While the sausage is being dried, a worker will occasionally manually brush the sausage to remove the surface formations and buildups that restrict or impair the drying process. In addition, when the processing is completed, the sausage is again brushed and even washed before it is packed for shipping or displayed for marketing.

Accordingly, it is a primary object of the present invention to provide an apparatus for brushing encased sausage being processed on a production basis. It is a related object to provide an apparatus of the foregoing type which also enables the washing of the sausage incident to the brushing operation.

It is another object of the invention to provide a sausage brushing apparatus which is relatively easy to operate, will handle a number of sausages at the same time and yet which may be easily disassembled and assembled for cleaning.

It is another object of the invention to provide an improved sausage brushing apparatus which will insure that brushing occurs completely around the periphery of the sausage.

It is still another object of the present invention to provide an improved sausage brushing apparatus which eliminates the formation of airborne particles during brushing that can be harmful to workmen operating the equipment or others present in the area of the brushing operation.

Other objects and advantages of the invention will become apparent by reference to the following detailed description and the accompanying drawings.

BRIEF DESCRIPTION OF THE DRAWINGS

FIG. 2 is a fragmentary perspective view of the base portion of the apparatus illustrated in FIG. 1 with the covering broken away, here illustrating the brushing elements and auxiliary blower exhausting arrangement therefor; and FIG. 3 is a fragmentary transverse sectional view taken substantially along the line 3—3 in FIG. 1.

Figure 1:
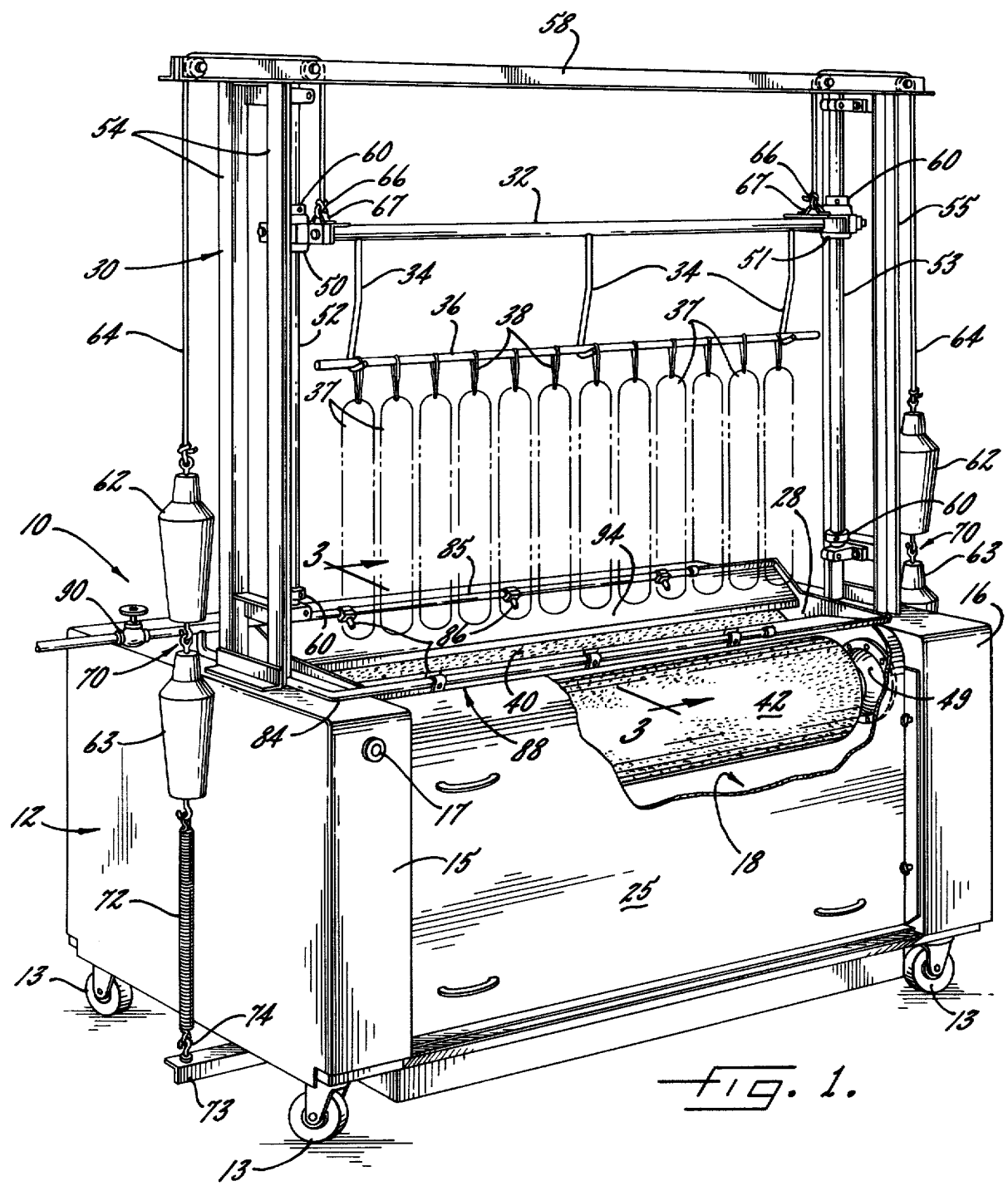
FIG. 1 is a perspective view of a sausage brushing apparatus in accordance with the present invention with a portion of the housing access panel broken away.

While the invention will be described in connection with a certain preferred embodiment, it will be understood that it is not intended to limit the invention to the particular illustrative embodiment. On the contrary, it is intended to cover all alternatives, modifications and equivalent arrangements as may be included within the spirit and scope of the invention.

DETAILED DESCRIPTION

Turning now to the drawings, there is illustrated in FIG. 1 an illustrative embodiment of the sausage brushing apparatus, indicated generally at 10, in the form of a generally rectangular, enclosed base housing 12 mounted on wheels 13. The housing is made up of a frame structure 14 (FIG. 2) which carries side panel members 15, 16 and a chamber 18 is defined within the housing which has a back wall 20, side walls 21, 22 and a bottom wall 23 having a drain opening 24 therein. A removable access panel 25 (FIG. 1) serves as the front wall and a part of the top wall of the chamber 18 (FIG. 3) to define an elongated opening 28 (FIG. 3) in conjunction with partial top wall 29. The side panel 15 carries a control switch 17 to actuate power to the apparatus.

The housing 12 carries an upright support structure 30 which includes a vertically movable, longitudinally extending member 32 having depending hook members 34 thereon adapted to receive a conventional stick 36 of the type used for hanging a plurality of sausages 37 suspended by their casing strings 38 during drying. The arrangement is such that the suspended sausages 37 are disposed above the elongated opening 28 in the base housing 12.

In carrying out the present invention, rotatable brushing means are provided for removing crusts or formations on the sausage casings upon downward movement of the suspended sausages 37 into the chamber 18 through the elongated opening 28 in housing 12. To this end, referring to FIGS. 1, 2 and 3 conjointly, a pair of elongated brushes 40, 42 are disposed within the chamber 18 beneath the elongated opening 28 with their respective shafts 43, 44 supported by journals 45 carried on opposite sides of the frame 14. Each of the brushes has its shaft protruding at one side through a journal to receive a pulley 46 driven by a belt 47 and motor 48. The arrangement is such that the individually driven brushes are counter-rotating with the peripheral direction of rotation being toward one another as viewed from the top. Disk shaped closures 49 (FIG. 1) surround the shafts and are secured to the side walls to protect the journal bearings.

In accordance with another of the important aspects of the present invention, the brushes 40, 42 have their axes generally parallel as viewed in the horizontal plane, but are skewed with respect to one another as viewed in the vertical plane (FIGS. 2 and 3). Because the brushes are skewed, a torque is applied to sausages 37 passing between the brushes thereby causing the sausages to rotate about their own axes so that the brushing action takes place about the whole periphery of the sausages (FIG. 3). The counter-rotating brushes tend to pull or draw the sausages 37 downwardly between the brushes into the enclosed chamber 18. The brushing action takes place due to the resistance or counteraction of the sausage carrying, vertically movable, structure during downward movement and there is still an increased brushing action when the sausages are pulled upwardly against the rotation of the brushes. In accordance with another important aspect of the invention, the vertically movable, longitudinally extending member 32 which supports the stick 36 and sausages 37 is mounted with respect to the upright support 30 so as to be counter-balanced and remain stationary even with the weight of the suspended sausages thereon. The counter-balancing is such that positive downward movement is required to move the sausages down through the opening 28 into the area between the brushes 40, 42 where the brushing action then assists in the downward movement of the sausages. To this end, the member 32 is provided with slide bearings 50, 51 at its respective ends that are received by rods 52, 53 which are in turn supported by upright end column structures 54, 55.

The end column structures 54, 55 are in the present embodiment suitably mounted at their lower ends to the respective base housing side panel members 15, 16 and their upper ends are connected to a cross member 58 that spans the top ends of the column structures 54, 55.

The upper and lower limits of the travel of member 32 along the rods 52, 53 may be adjustably set by collars 60 provided with suitable clamping arrangements such as set screws or the like.

In order to provide the required counter-balancing, weights 62, 63 located outboard the ends of the apparatus 10 are suspended by cords 64 passing over roller slides or the like carried by cross member 58 with the ends of the cords 66 being attached to fastening members 67 carried by the member 32.

As here shown, a hook and eyelet arrangement, indicated at 70, is provided between the weights 62 and 63 so that weight 63 may be readily removed. Similarly, additional weights may be added depending upon whether or not the particular load of sausages being handled is lighter or heavier.

In order to further provide for the required counter-balancing, springs 72 (only one being shown in FIG. 1) are connected between the lower weight 63 and a frame member 73 having a hook 74. It will be appreciated that instead of springs any suitable elastic or resiliently expandable coupling may be used. The function of the springs is to provide a desirable progressive reaction force tending to pull the member 32 upwardly as it is pushed downward and subjected to the additional downward pull during the brushing action. In addition, the springs provide restraint to the weights against their being swung such as when the apparatus is being moved from one place to another. By predetermined selection of the springs and the weights, the counter-balancing achieved readily permits the member 32 carrying the suspended sausages to be moved upwardly and downwardly without excessive forces being required and when a positive force in either the upward or downward direction is discontinued the member 32 with the suspended sausages will stay in a stationary position.

Referring to FIG. 2, there is illustrated another aspect of the invention wherein provision is made for exhausting air from the base housing chamber 18 so that a draft is created in the direction down through the elongated opening 28 and the brushing area to the chamber 18. This prevents particle materials brushed from the sausages to become airborne around the exterior of apparatus 10. To this end, referring to FIG. 2, sidewall 22 is provided with a fitting 76 having an opening therein adapted to receive a conduit 78 attached to the intake of a blower unit 80. The exhaust side 82 of the blower may be connected to a suitable filtering unit or cleaner device (not shown) that prevents discharge of the removed materials to the atmosphere.

In accordance with still another aspect of the present invention, provision is made for wetting the brushes and/or the sausages being brushed with a liquid that may be either plain water or an appropriate wash solution. With sausage that is processed by air drying, brushing would normally be done in the absence of any liquid wash until the sausage products are ready to be prepared for marketing.

Accordingly, referring to FIGS. 1 and 3, fluid conduits 84, 85 having spray nozzles 86 are disposed on opposite sides of the opening 28 and are carried by a removable guide 88. The conduit 85 is connected through a valve 90 to a source of liquid (not shown) that is to be sprayed.

The guide 88 is generally trough-shaped with upperly sloped front and rear walls 92, 94 so that any liquid leaving the spray nozzles landing on the walls 92, 94 would be directed downwardly into the opening 28 and fall onto the brushes 40, 42. The drain opening 24 in the bottom wall of chamber 18 may be used to remove accumulated liquid wash by providing a hookup for connection to a sewer or by keeping the opening 24 plugged and then moving the apparatus 10 to a floor drain.

In order to more fully understand the operation of the brushing apparatus of the present invention, a brief description of the typical operating cycle is as follows referring to FIG. 1. A plurality of sausages 37 as suspended on their carrying stick 36 during or after the air drying processing is hung on the depending hooks 34 of member 32 which is in its uppermost position. The counter-balancing weights 62, 63 and spring 72 hold the suspended sausages substantially as they are shown in FIG. 1. Control button 17 may then be pushed to commence the rotation of the brushes 40, 42. The operator then need only push down on member 32 to start the feed of the sausages into the elongated opening 28 and into the area between the brushes. When the sausages 37 have passed completely down through the brushing area, the operator then pushes the member 32 upwardly until it is returned to the uppermost position as shown in FIG. 1. This action may be repeated several times until it is observed that the sausages are brushed off or cleaned in the desired manner.

It will be appreciated by those skilled in the art that while the invention has been disclosed with the upright structure 30 being mounted to the base housing, the sausage carrying structure may be separate from the base housing and self-supporting. Also, it will be appreciated that while the arrangement here shown is intended to be manually operated, power actuating means may be employed to move the member 32 up and down with respect to the base housing.

I claim as my invention:

1. Apparatus for brushing encased sausages and the like to remove encrusted materials therefrom comprising, in combination, an enclosed housing having a chamber therein, means defining an elongated opening on the upper surface of the housing leading to the chamber, upright support means disposed above said housing including a vertically movable transverse member means for suspending a plurality of said encased sausages above said housing opening adapted to move said suspended sausages into the housing through said opening, means including a pair of elongated brushes disposed within the housing chamber and beneath the housing opening, the axes of said brushes being generally parallel and skewed with respect to one another, and means for counter-rotating said brushes at predetermined speeds and directions so that encased sausages suspended from said vertically movable transverse member means upon downward movement thereof pass between the rotating brushes and the sausages are rotated about their own axes by and during the brushing action thereon.

2. Apparatus as claimed in claim 1 wherein said transverse member means is counter-balanced on said support so that the transverse member means remains self-supporting with the sausages suspended therefrom.

3. Apparatus as claimed in claim 1 including fluid spray means disposed adjacent at least one side of said housing opening for washing the sausages incident to said brushing.

4. Apparatus as claimed in claim 1 wherein blower means associated with said housing produces a draft from said housing opening through the housing chamber so that said encrusted materials brushed from the sausage casings are prevented from being airborne outside the housing and are exhausted therefrom.

5. Apparatus as claimed in claim 1 wherein said upright support means is mounted to said housing.

6. Apparatus as claimed in claim 2 wherein said transverse member means is slidably carried on a pair of spaced rods and said counter-balancing is provided by suspended weights connected to said transverse member means.

7. Apparatus as claimed in claim 6 wherein said counter-balance means includes spring means attached between said weights and the housing.

8. Apparatus as claimed in claim 3 wherein said fluid spray means is carried on a removable trough-shaped guide adapted to be received by said housing opening.

9. Apparatus as claimed in claim 8 wherein said guide includes outwardly sloped front and back walls to direct fluid to the housing opening.

* * * * *